(12) United States Patent
Saporito (10) Patent No.: US 11,086,951 B1
(45) Date of Patent: *Aug. 10, 2021

(54) SYSTEM AND METHODS FOR ENABLING DISINTERMEDIATED COMMUNICATION ASSOCIATED WITH SEARCH OPERATIONS

(71) Applicant: Coupa Software Incorporated, San Mateo, CA (US)

(72) Inventor: Fabrice Saporito, Brookline, MA (US)

(73) Assignee: COUPA SOFTWARE INCORPORATED, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/705,130

(22) Filed: Dec. 5, 2019

Related U.S. Application Data (63) Continuation of application No. 16/234,040, filed on Dec. 27, 2018, now Pat. No. 10,503,800.

(51) Int. Cl.
  *G06F 16/00*    (2019.01)
  *G06F 16/9535*  (2019.01)
  *H04L 29/08*    (2006.01)
  *H04L 12/58*    (2006.01)

(52) U.S. Cl.
  CPC ......... *G06F 16/9535* (2019.01); *H04L 51/04* (2013.01); *H04L 67/1097* (2013.01)

(58) Field of Classification Search
  None
  See application file for complete search history.

(56) References Cited

U.S. PATENT DOCUMENTS

| | | | | |
|---|---|---|---|---|
| 7,062,561 B1* | 6/2006 | Reisman | ............... | G06F 16/00 709/227 |
| 8,577,913 B1* | 11/2013 | Hansson | ............... | G06F 3/048 707/767 |
| 8,959,082 B2* | 2/2015 | Davis | ............... | G06F 16/436 707/723 |
| 8,990,352 B1* | 3/2015 | Kosslyn | ............... | G06F 16/951 709/219 |
| 9,009,135 B2* | 4/2015 | Gutlapalli | ............... | G06F 16/00 707/711 |

(Continued)

OTHER PUBLICATIONS

Saporito, U.S. Appl. No. 16/234,040, filed Dec. 27, 2018, Notice of Allowance, dated Sep. 25, 2019.

*Primary Examiner* — Farhan M Syed
(74) *Attorney, Agent, or Firm* — Baker Botts L.L.P.

(57) ABSTRACT

This disclosure is directed to systems and methods for network communication disintermediation, including providing a search platform where the query terms employed by one party become a searchable medium which is usable by a second party, therefore disintermediating traditional search engines. Further, the system and methods provide for activatable communication channels which may be used to open lines of communication between different users when their interests, e.g. search query terms, etc., align. The system's servers generate searchable compilations of users' query terms, which other users may access. In some cases, the users may establish communication channels with other users based on the content of their query terms. The disclosed systems and methods provide for a number of additional functionalities, including the generation of alerts and search results.

16 Claims, 5 Drawing Sheets

(56) References Cited

U.S. PATENT DOCUMENTS

| | | | |
|---|---|---|---|
| 9,860,368 B2 * | 1/2018 | Aggarwal | H04L 51/36 |
| 2008/0177994 A1 * | 7/2008 | Mayer | G06F 9/4418 |
| | | | 713/2 |
| 2008/0307339 A1 * | 12/2008 | Boro | H04L 63/08 |
| | | | 715/764 |
| 2010/0036934 A1 * | 2/2010 | Bruster | H04L 51/04 |
| | | | 709/219 |
| 2011/0191312 A1 * | 8/2011 | Gutlapalli | G06F 16/00 |
| | | | 707/706 |
| 2011/0191326 A1 * | 8/2011 | Gutlapalli | G06F 16/00 |
| | | | 707/723 |
| 2011/0191333 A1 * | 8/2011 | Gutlapalli | G06F 3/048 |
| | | | 707/725 |
| 2012/0303476 A1 * | 11/2012 | Krzyzanowski | G06F 8/60 |
| | | | 705/26.5 |
| 2013/0231974 A1 * | 9/2013 | Harris | G06Q 30/0201 |
| | | | 705/7.29 |
| 2014/0025692 A1 * | 1/2014 | Pappas | G06F 16/00 |
| | | | 707/754 |
| 2014/0229614 A1 * | 8/2014 | Aggarwal | H04M 3/2236 |
| | | | 709/224 |
| 2015/0039597 A1 * | 2/2015 | Raina | G06F 16/9535 |
| | | | 707/723 |
| 2016/0253409 A1 * | 9/2016 | Pappas | G06F 16/00 |
| | | | 707/738 |

* cited by examiner

SYSTEM AND METHODS FOR ENABLING DISINTERMEDIATED COMMUNICATION ASSOCIATED WITH SEARCH OPERATIONS

BENEFIT CLAIM

This application claims the benefit under 35 U.S.C. § 120 as a Continuation of application Ser. No. 16/234,040, filed Dec. 27, 2018, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

TECHNICAL FIELD

The present disclosure relates, according to some embodiments, to network communication disintermediation and, more specifically, to providing users with search terms employed by other users of the system and enabling communication channels between the users.

BACKGROUND

Search engines have fundamentally not changed since the 1990's when they were first introduced. A user enters search terms into a form and the system looks for matches in the back end and returns results. There is a need for a search engine with improved functionality.

SUMMARY

The disclosed systems and methods provide an unconventional solution to the above problems by removing the intermediate between search and result, i.e. "disintermediation," by making search strings visible, searchable, and engageable. Using the disclosed systems and methods, even a user without a web presence, e.g. a vendor, supplier, business, etc., is able to browse anonymized search strings entered by users and start a conversation with them.

According to some embodiments, a method of network communication disintermediation, may comprise the steps of receiving, at one or more servers, a first user identifier and one or more connecting terms from a first user device, wherein the first user device is further configurable to generate the first user identifier and the one or more connecting terms, and transmit the first user identifier and the one or more connecting terms to the one or more servers, generating a first compilation at the one or more servers, the first compilation including at least the first user identifier and the one or more connecting terms, receiving, at the one or more servers, a second user identifier and at least one query term from a second device, wherein the second device is configurable to generate the second user identifier and the at least one query term, and transmit the second user identifier and the at least one query term to the one or more servers, comparing the at least one query term to at least a portion of the first compilation, determining an at least partial match between the at least one query term and the at least a portion of the first compilation, generating, in response to the at least partial match between the at least one query term and the at least a portion of the first compilation, a result, wherein the result comprises the first user identifier, and an alert, wherein the alert comprises an activatable communication channel between the first user device and the second user device, transmitting the result to the second user device and transmitting the alert to the first user device, the first user device being further configurable to receive the alert, activate the activatable communication channel, and transmit, using the activated communication channel, a message to the second user device.

According to some embodiments, the disclosed methods may further comprise the steps of generating a second compilation at the one or more servers, the second compilation including at least the second user identifier and the at least one query term.

According to some embodiments, the disclosed methods may further comprise the steps of receiving, at the one or more servers, a compilation request from the first user device, generating, in response to the compilation request, a compilation response, the compilation response including at least a portion of the second compilation, and transmitting the compilation response to the first device.

According to some embodiments, the at least a portion of the second compilation may comprise at least one second user identifier.

According to some embodiments, the compilation response may further comprise an activatable communication channel between the first user device and the second user device.

According to some embodiments, the message comprises an instant message.

According to some embodiments, the message comprises an email.

According to some embodiments, the message comprises a text message.

According to some embodiments, a method of network communication disintermediation, the method comprising the steps of receiving, at one or more servers, a first user identifier and at least one query term from a first device, wherein the first device is configurable to generate the first user identifier and the at least one query term and transmit the first user identifier and the at least one query term to the one or more servers, generating a first compilation at the one or more servers, the first compilation including at least the first user identifier and the at least one query term, receiving, at one or more servers, a second user identifier and a compilation request from a second user device, wherein the second user device is configurable to generate the second user identifier and the compilation request and transmit the second user identifier and the compilation request to the one or more servers, generating, in response to the compilation request, a compilation response, wherein the compilation response comprises at least a portion of the second compilation, and transmitting the compilation response to the second user device.

According to some embodiments, the method may further comprise the steps of receiving, at the one or more servers, one or more connecting terms from the second user device, generating a second compilation at the one or more servers, the second compilation including at least the second user identifier and the one or more connecting terms, comparing the at least one query term to at least a portion of the second compilation, determining an at least partial match between the at least one query term and the at least a portion of the second compilation, generating a result in response to the at least partial match between the at least one query term and the at least a portion of the second compilation, the result comprising the second user identifier, and transmitting the result to the first device.

According to some embodiments, the method may even further comprise the steps of generating an alert in response to the at least partial match between the at least one query term and the at least a portion of the second compilation, the alert comprising an activatable communication channel between the second user device and the first user device, and transmitting the alert to the second user device.

According to some embodiments, the second user device may be further configurable to receive the alert from the one or more servers, activate the activatable communication channel, and transmit, using the activated communication channel, a message to the first user device.

According to some embodiments, the compilation response may further comprise an activatable communication channel.

According to some embodiments, the second user device may be further configurable to receive the compilation response from the one or more servers, activate the activatable communication channel, and transmit, using the activated communication channel, a message to the first user device.

According to some embodiments, the message comprises an instant message.

According to some embodiments, the message comprises an email.

According to some embodiments, the message comprises a text message.

According to some embodiments, a system for network communication disintermediation may comprise one or more servers, the one or more servers comprising at least one memory comprising server instructions and at least one processing device configured for executing the server instructions, wherein the server instructions cause the at least one processing device to perform operations of receiving, at one or more servers, a first user identifier and at least one query term from a first device, wherein the first device is configurable to generate the first user identifier and the at least one query term, and transmit the first user identifier and the at least one query term to the one or more servers, generating a first compilation at the one or more servers, the first compilation including at least the first user identifier and the at least one query term, receiving, at one or more servers, a second user identifier and a compilation request from a second user device, wherein the second user device is configurable to generate the second user identifier and the compilation request, and transmit the second user identifier and the compilation request to the one or more servers, generating, in response to the compilation request, a compilation response, wherein the compilation response comprises at least a portion of the second compilation, and transmitting the compilation response to the second user device.

According to some embodiments, the server instructions may further cause the at least one processing device to perform the operations of receiving, at the one or more servers, one or more connecting terms from the second user device, generating a second compilation at the one or more servers, the second compilation including at least the second user identifier and the one or more connecting terms, comparing the at least one query term to at least a portion of the second compilation, determining an at least partial match between the at least one query term and the at least a portion of the second compilation, generating a result in response to the at least partial match between the at least one query term and the at least a portion of the second compilation, the result comprising the second user identifier, and transmitting the result to the first device.

BRIEF DESCRIPTION OF THE DRAWINGS

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION OF THE EMBODIMENTS

Search terms are generally made accessible as "analytics" and are essentially used for optimization and for search engine companies to monetize their platforms. Monetization is largely done by auctioning search terms to the highest bidders for them to be placed as high as possible on a page and generate clicks, which turn into cash for the search engine company. There are currently around 33 million businesses that operate in the United States alone. Of those, about 1000 command about 77% of the GDP. A large number of consumers utilize search engines to locate potential suppliers and, with the current system of indexing websites and webpages, many small businesses get lost in the massive amount of data available. Further, the classic model of searching, particularly with respect to buyers and sellers, provides that either buyers initiate contact with sellers in order to make a meaningful connection or that buyers somehow "post" that they are looking for a particular good or service and allow sellers to search them out. This is a particularly unnatural way for buyers and sellers to connect and has created friction in the system, especially with respect to small businesses.

In the following detailed description, numerous specific details are set forth by way of examples in order to provide a thorough understanding of the relevant teachings. However, the present teachings may be practiced with or without such specific details. In other instances, well-known methods, procedures, components, and/or circuitry have been described at a relatively high level, without detail, in order to avoid unnecessarily obscuring aspects of the present teachings. The various technologies described in this specification generally relate to networking communication, and more specifically relate to methods and systems for networking communication disintermediation over fixed and packet networks using disclosed user devices, such as personal computers and mobile devices, and accessible databases through which users may access search history information about themselves and/or other users on the networks. Further, the disclosed methods and systems for network communication disintermediation provide for users to open channels of communication with each other based on information accessed through the above mentioned databases.

Figure 1:
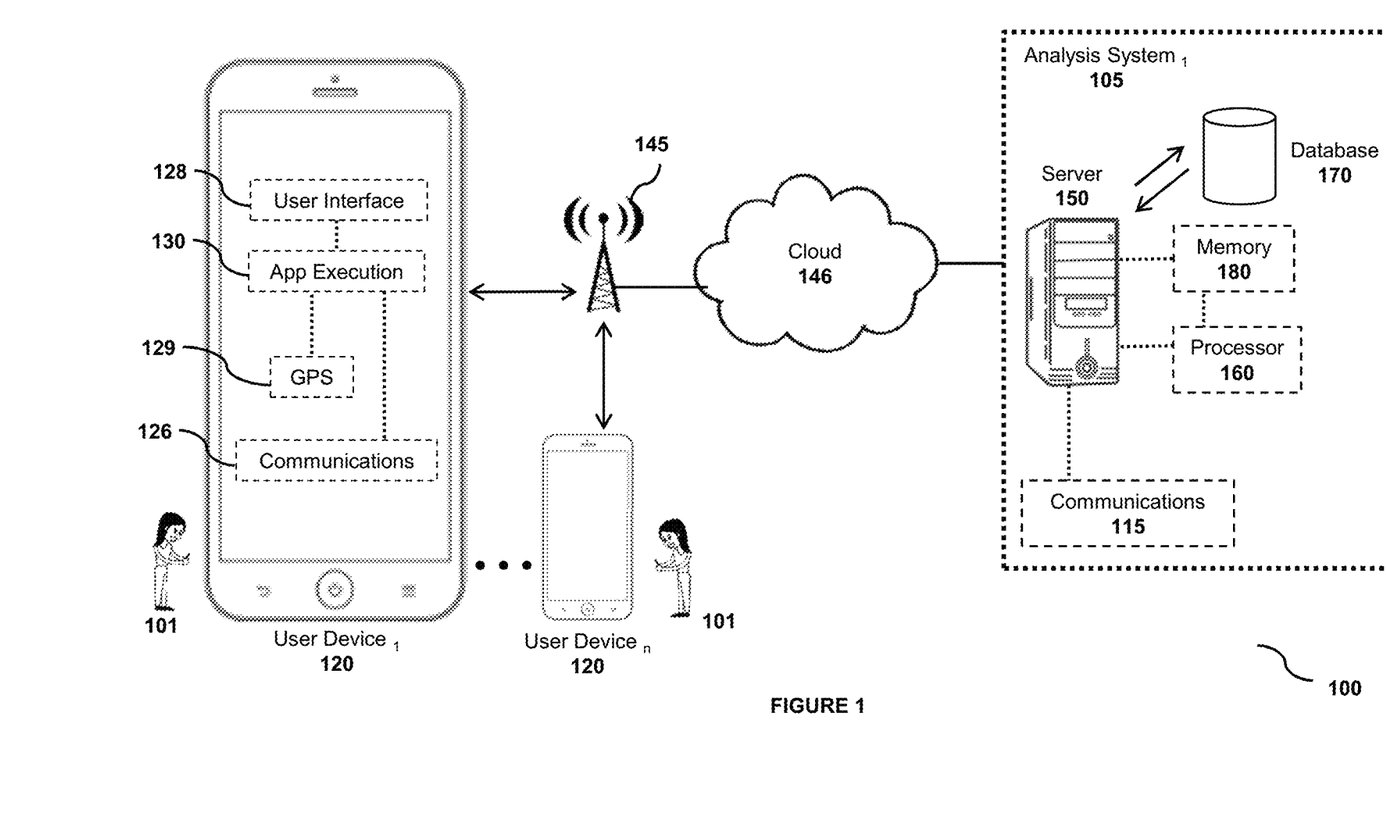
FIG. 1 shows a schematic block diagram of a system for network communication disintermediation in accordance with disclosed embodiments.

FIG. 1 describes a schematic block diagram of an operating system for networking communication disintermediation 100. The system 100 provides for a user device 120 having a combination app execution subsystem 130, user interface subsystem 128, and communications subsystem 126 that provides a user 101 with the ability to conduct database searches and to establish lines of communication based on the content of the results. The user device 120 further may comprise a GPS subsystem for providing geo-location data in order to optimize search results. A user 101 may interact through the user interface subsystem 128 to initiate a search query at the user device 120. Further, the user interface subsystem 128, in combination with one or more of the other subsystems, may provide a user 101 access to any of the disclosed functionalities of the overall system, e.g. receiving search results, viewing search queries submitted by other users, and/or initiating communications.

The system 100 provides for search functionality through the transmission of search queries through a wireless network 145 such as the case when the user device 120 is a personal electronics device such as a cell phone, tablet, wirelessly connected personal computer, smart device, Internet of Things (IoT) device, or in other instances the search queries could be transferred through a wired network (not shown). The illustrated cloud network 146, such as the internet, can be used to further transmit the search query to one or more servers 150 for processing, and the servers 150 may provide for further user engagement such as to receive results of a search query, to enable a user to view the search queries of other users, or to receive invitations to connect with other users 101 through lines of communication. Further, the servers 150 may provide location-specific results to the search query based on location and the time of day, which would be further facilitated by a Global Positioning System (GPS) or other location subsystem 129 and, according to some embodiments, using time-of-day technology (not shown) that is also included within the user device 120.

A wireless communications network 145 may be a 3G network, 4G, LTE, 5G, Wi-Fi, Bluetooth, or any other network protocol and may be a combination of any number of networks. Further, as mentioned above a wired network connection such as a conventional Ethernet connection could be used, such as with a personal computer with an Ethernet port. User devices 120 may include processors such as digital signal processors or a microprocessors for performing the different methods described in this specification.

Also, user profiles and histories of search queries, search results, communications histories, shopping histories, etc., can be processed and stored in servers 150 and their associated memories 180 or databases 170. By providing servers 150 communicating with multiple user devices 120, the servers and an overall analysis system 105 can be provided that can provide more accurate and/or detailed suggestions based upon data from multiple user devices 120, e.g. proximity to other users, overall activity in a certain area, number of similar search queries in a certain area, popularity of certain destinations, number of responses to invitations to connect, etc. Further provided within the overall analysis system 105, app servers (not shown) may be provided for interaction with the user 101 through apps developed in the context of the present disclosure for a user's use on their personal computing devices 120 (such as a cell phone, tablet, or back-end web apps) and/or web servers (not shown) may be provided by which a user 101 could login to their account to access their historical data through a traditional client/server interface or other direct interface with a user device.

Further, servers 150, their associated units, e.g. processors 160, memories 180, communications centers 115, and/or associated databases 170, may provide users 101 with a means to view the search queries of other users 101. For example, if a first user 101 submits a search query from a user device 120, the server 150 may provide the user 101 with search results based on at least a partial match between the submitted search query and any of the information contained either in the memory 180 or databases 170 associated with the servers 150. The system 100 of the current disclosure, according to some embodiments, may further provide a user 101 with the ability to view search queries submitted by other users, e.g. a second user, a third user, a fourth user, etc. Further, the disclosed system 100 may allow a user 101 to open a line of communication with another user, e.g. a second user, a third user, etc., based on a number of criteria. For example, a user 101 may be offered the option to open a line of communication based on the contents of a search query submitted by another user.

Although the servers 150 illustrated in the present figure are illustrated as stand-alone computing machines, the computing functionality, including servers 150, processors or processor instances 160, communications centers 115, memory or computing data storage areas 180, and databases 170 can be provided through a cloud implementation such as Amazon Web Services or by a hybrid enterprise/cloud architecture. It is understood that the terms system, apparatus, device, etc. may be used interchangeably in this specification. In some embodiments, a method is provided for performing the various steps performed by any computing device, e.g. user device 120, described herein. In some embodiments, a non-transitory computer-readable medium comprising code is provided for causing any user device 120, computing device, or server 150, to perform the various methods described herein. The scope of any claims that may be a part of this application or any application stemming from the present application shall be determined by those claims as read in light of the claims, but the elements of the particularly illustrated embodiments shall not be imputed to the claim language unless particularly invoked through the use of means-plus-function language under 35 U.S.C. Section 112(f).

Figure 2:
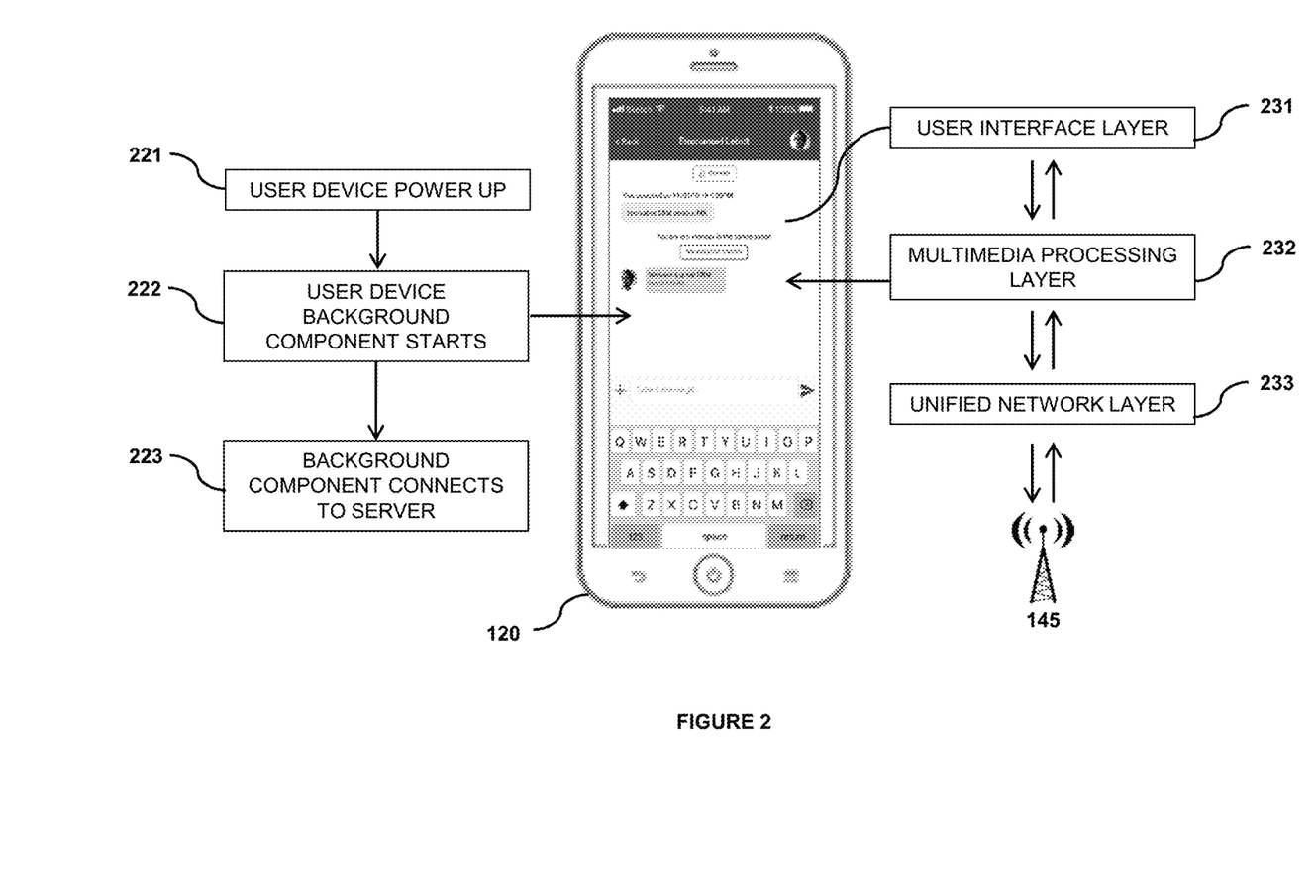
FIG. 2 shows a flowchart that schematically represents startup of a method for network communication disintermediation and the different functional layers associated with a user device of the system according to disclosed embodiments.

FIG. 2 illustrates a flowchart that schematically represents a method for initiating a session for network communication disintermediation at a user device 120 by background and foreground components. According to some embodiments, the process begins at power up 221 upon which, at activity 222, a user device background component may be loaded into the app execution system 130 of FIG. 1 and may start execution. The user device background component may connect 223 to a server over the IP layer provided by any available data channel of the underlying wireless network 145 or other network. A server 150 may require that a user device 120 possess the appropriate credentials on the system in order to initiate a connection 223 with the background component.

A user device 120 may include different schematic layers, e.g. a user device hardware layer, one or more device drivers, an operating system, a network communications disintermediation background component, and a network communications disintermediation foreground component. A user device 120 may further include any combination of a user interface layer 231, a multimedia processing layer 232, and a unified network layer 233. The user interface layer 231 may handle interaction with users and may allow a user to control the operation of a program. Additionally, the user interface layer 231 may render on the user device 120 any received audio or visual signals from the server. The multimedia processing layer 232 manages the decoding and rendering of audio and visual signals received from the server, as well as the capturing and encoding of any audio and/or visual signals from the user device 120 hardware. The unified network layer 233 handles the packaging and transmission of encoded audio and visual data, together with necessary auxiliary information, down to an abstract interface representing the underlining data network connections. The unified network layer 233 manages communications with wireless networks 145 and collects relevant data packets received and presents the data up to the multimedia processing layer 232 as a single logical network interface.

Although various system elements such as the ones described in FIG. 1 (but also those described in various other figures of the present application) can provide the functionality of the layers described with respect to FIG. 2, in an exemplary approach, the functionalities of the user interface layer 231 are generally provided by the application execution subsystem 130 in communication with the user interface 128, such that the commands and graphics provided in the user interface 128 would be provided by the application execution subsystem 130. Further, the functions of the media processing layer 232, and particularly functions relating to the processing of incoming images and channels of communication are generally provided by the elements of the processor 160 within the overall analysis system 105 in communication with the server 150 and under control of program memory, such as the memory 180 associated with the processor 160. With regard to the unified network layer, this functionality is generally accomplished in preferred embodiments by the app execution subsystem 130 and the server 150.

Figure 3:
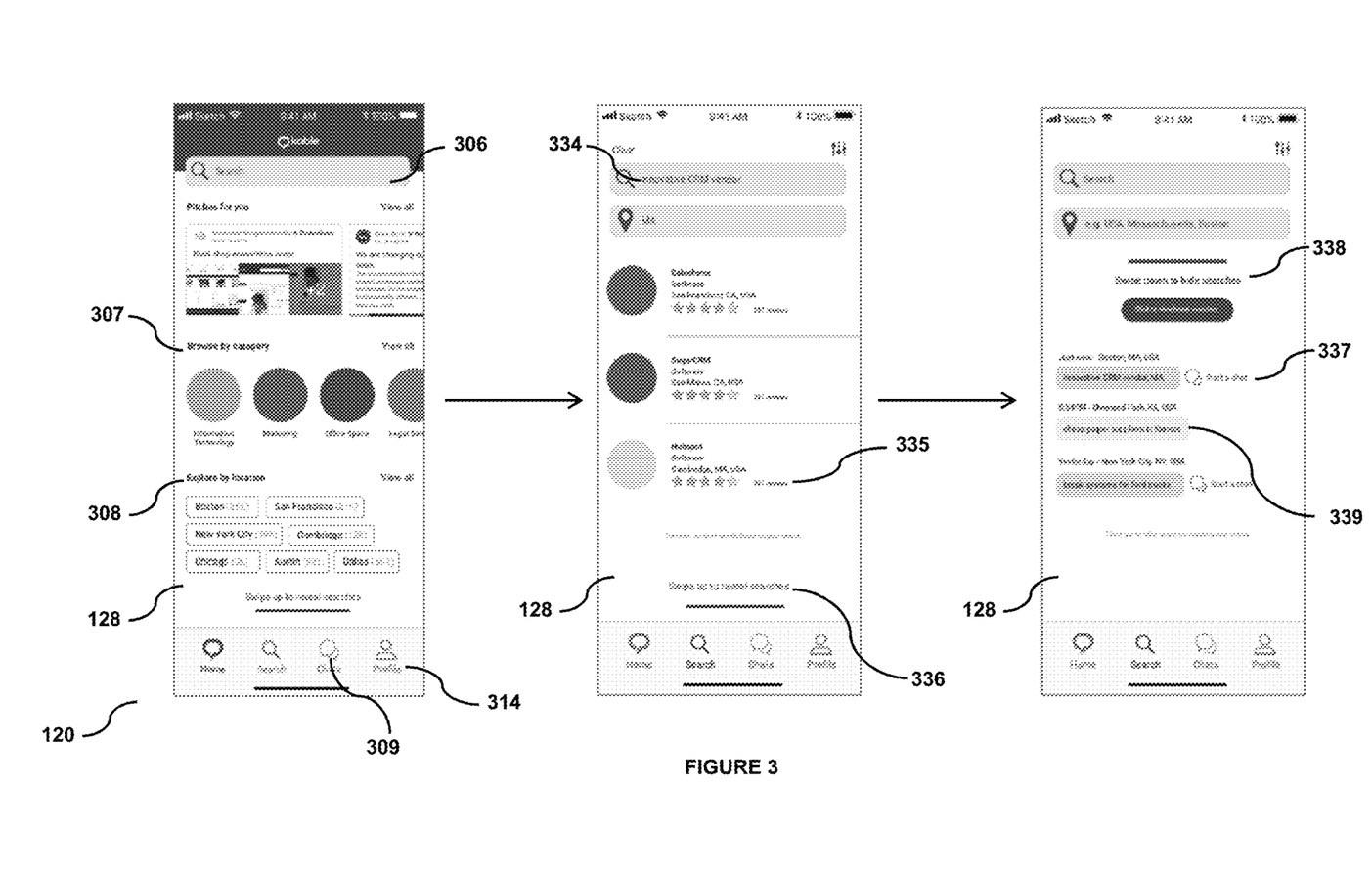
FIG. 3 shows features and functionalities of the user interface layer in accordance with disclosed embodiments.

Illustrated in FIG. 3, a user that is successfully logged in may interact with the methods and systems described on a user device 120 and through a user interface 128. According to some embodiments, a user interface 128 may provide users with multiple ways to interact with the disclosed system. For example, a user may be allowed to enter a search query 334 into a search field 306 by using text, voice-to-text, etc. The user interface 128 may allow a user to browse information about other users based on categories 307 or on location 308. In these embodiments, the contents of the browse function may be provided based on a number of criteria, e.g. browsing history of the user, previously used search terms, or geolocation data provided by the GPS subsystem 129 of FIG. 1. Further, the user interface 128 may provide a user with means to access lines of communication 309 and/or means to view, modify, or create a user profile 314.

In an exemplary embodiment, illustrated in FIG. 3, the user has entered the search query 334 "innovative CRM vendor" into the search field 306. The user is provided with search results 335 based on the search query 334. Further, the disclosed system provides through the user interface 128 a means to view other users' search queries 339. As illustrated, a user may, through the user interface 128, opt to view other search queries 339 through an icon 336 or other activatable means. In the exemplary embodiment of FIG. 3, a user may use a swiping motion on the screen to reveal other search queries 339. Further, the user interface 128, in conjunction with the communications subsystem 126 of FIG. 1, may offer the user an option to open a line of communication, e.g. email, chat session, voice and/or audio communication, with another user associated with the search queries 339. In some embodiments, this option may be presented as an activatable link 337. A user may return to the search results 335 by activating another icon 338. In the exemplary embodiment of FIG. 3, a user may return to search results 335 with a swiping motion on the screen.

Figure 4:
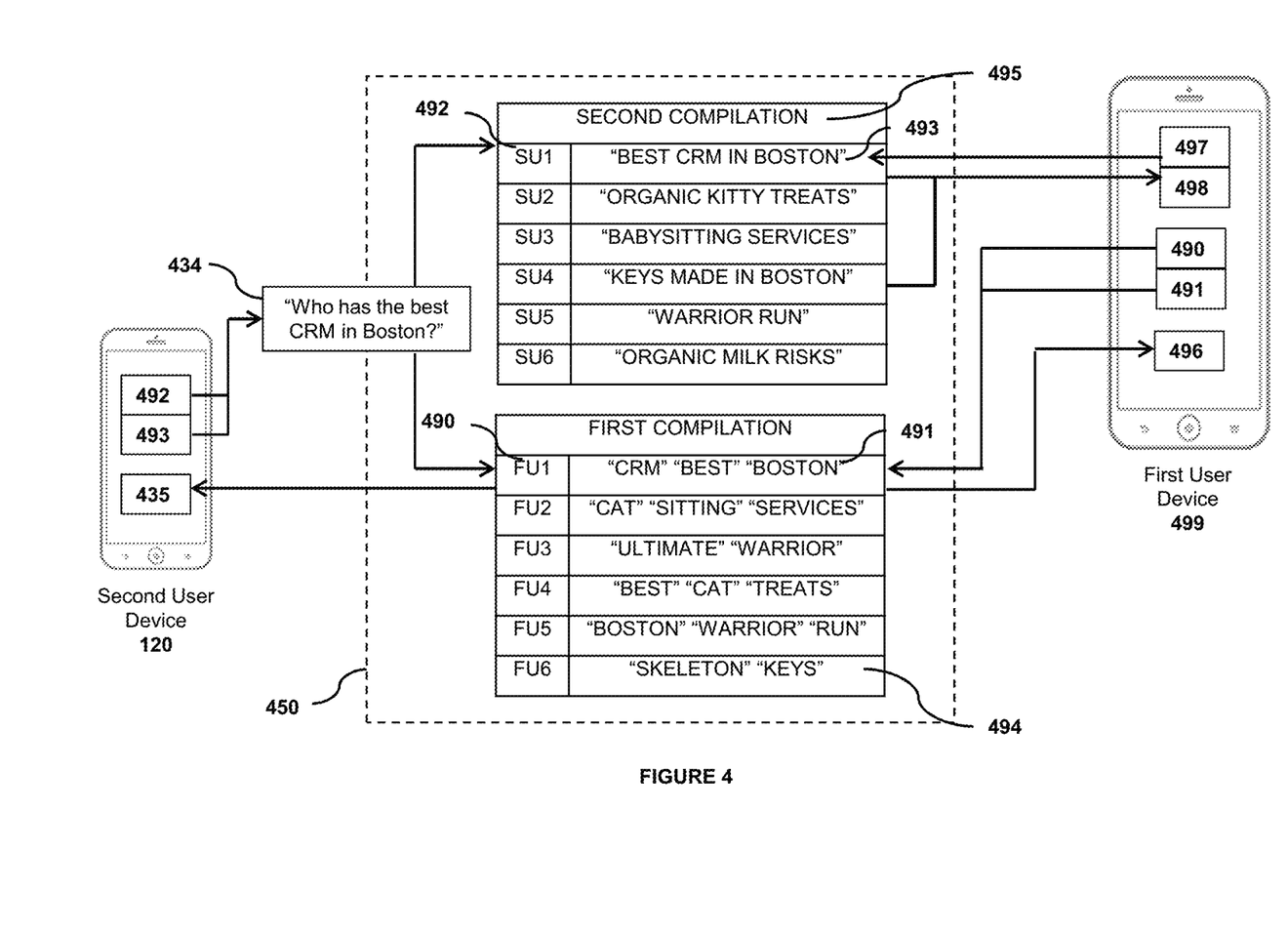
FIG. 4 shows an embodiment of a method of creating and accessing compilations in accordance with disclosed embodiments.

Referring now to FIG. 4, a system for networking communication disintermediation may comprise multiple user device, e.g. a first user device 499, a second user device 120, etc. While the following description describes a system for networking communication disintermediation in terms of a first user device 499 and a second user device 120, it should be appreciated that these descriptions are for illustrative purposes only and that (1) the system may comprise more than two user devices, e.g. a third user device, a fourth user device, etc., and (2) each user device included in the system may be configurable to perform any one or more of the operations described for the first user device 499 or the second user device 120. For example, the second user device 120 may be configurable to perform any one or more of the operations described for the first user device 499, the first user device 499 may be configurable to perform any one or more of the operations described for the second user device 120, and a third user device, fourth user device, etc., may be configurable to perform any of the operations described for a first user device 499 or a second user device 120.

In some embodiments, a first user device 499 may be configurable to generate, using the functionalities and subsystems described above, a first user identifier 490. A first user identifier 490 may be any means of identifying the first user device 499 or a first user. For example, and without limitation, a first user identifier 490 may be any one or more of a profile name, a business name, a unique device identifier such as an IP address, or a string of characters that may be used to identify the first user device 499, the user of the device, or both. Further, a first user device 499 may be configurable to generate one or more connecting terms 491. According to some embodiments, connecting terms 491 may be any number of words, images, or strings of characters which may be associated with any combination of a first user identifier 490, a first user device 499, or a user. In the exemplary embodiment of FIG. 4, the first user device 499 has generated a first user identifier 490 comprising the characters "Fill," and multiple connecting terms 491 comprising the words "CRM," "BEST," and "BOSTON."

Through the communications subsystem 126 of FIG. 1 and/or the unified network layer 233 of FIG. 2, the first user device 499 may be further configurable to transmit any combination of a first user identifier 490, one or more connecting terms 491, and other associated information to one or more servers 450. Using the functionalities, units, and subunits described in detail in FIG. 5 below, the one or more servers 150 may generate a first compilation 494. According to some embodiments, the first compilation 494 may comprise any combination of a first user identifier 490, one or more connecting terms 491, and any other information. Further, the first compilation 494 may include user identifiers and connecting terms originating from multiple users, e.g. a first user, a second user, etc., and/or from multiple user devices, e.g. a first user device 499, a second user device 120, a third user device, a fourth user device, etc. In the exemplary embodiment of FIG. 4, the first compilation 494 comprises the first user identifier 490, the connecting terms 491, and user identifiers and connecting terms for other users, e.g. "FU2," "FU3," "FU4," etc. The first compilation 494 may be organized and/or stored at one or more servers 150, and/or at one or more databases associated with the one or more servers (such as the database 170 of FIG. 1) in a manner such that it is searchable. While the first compilation 494 of FIG. 4 is presented as comprising a first user identifier 490 and one or more connecting terms 491, it should be appreciated that a first compilation 494 may comprise any pairing of information that (1) represents a user, e.g. first user identifier 490, screen name, profile name, IP address, randomly generated identifier, etc., and (2) may be associated with that user, e.g. connecting terms 491, historically used search terms, profile information, behavior, reviews, geolocation, etc. Further, it should appreciated that connecting terms 491 may be compiled in a first compilation 494 in their original form or may be a modified version of the original form, e.g. derivatives which may account for spelling mistakes, etc.

The second user device 120 may be configurable to generate, using the functionalities and subsystems described above, a second user identifier 492. A second user identifier 492 may be any means of identifying the second user device 120 or a second user. For example, and without limitation, a second user identifier 492 may be any one or more of a profile name, a business name, a unique device identifier such as an IP address, or a string of characters that may be used to identify the second user device 120, the user of the second device, or both. In the exemplary embodiment of FIG. 4, the second user device 120 has generated the second user identifier 492 "SU1."

Further, a second user device 120 may be configurable to generate one or more query terms 493. In some embodiments, one or more query terms 493 may comprise the search query 334 of FIG. 3. Referring back to FIG. 4, the one or more query terms 493 may be any number of words, images, or strings of characters which may be associated with any combination of a second user identifier 492, a second user device 120, or a user. In the exemplary embodiment of FIG. 4, the second user device 120 has generated a search query including the query terms 493 "Who has the best CRM in Boston?"

Through the communications subsystem 126 of FIG. 1 and/or the unified network layer 233 of FIG. 2, the second user device 120 may be further configurable to transmit any combination of a second user identifier 492, one or more query terms 493, and other associated information to one or more servers 450. The one or more servers 450, upon receipt of the one or more query terms 493 may be configurable to search at least a portion of the first compilation 494 and generate a result 435 in response to a match, a partial match, or other defined criteria between the one or more query terms 493 and the connecting terms 491 of the first compilation 494 or a portion of the first compilation 494. The one or more servers 450 may be further configurable to transmit the result 435 to the second user device 120. While the composition of the result 435 may vary as discussed below, in an example embodiment, the result comprises at least the first user identifier 490. It should be appreciated, however, that the result 435 may comprise any information, image, etc. that a user designates to be transmitted to the second device 120 in response to a match, a partial match, or other defined criteria between the one or more query terms 493 and the one or more connecting terms 491 of the first compilation 494. In the exemplary embodiment of FIG. 4, the query terms 493 included in the search query 434 "who has the best CRM in Boston," were determined to have at least a partial match with the connecting terms 491 "CRM," "BEST," and "BOSTON," stored at the first compilation 491. In this embodiment, a result 435 was generated and transmitted to the second user device 120. A second device 120 may be further configurable to display a result 435 (using the multimedia processing layer 232 and user interface layer 231 of FIG. 2) in a manner which may be consistent with FIG. 3. In FIG. 3, the search results 335 are displayed on the user interface 128. In this example, the name of the business, location, and ratings may all be included in the result 435 of FIG. 4.

According to some embodiments, the one or more servers 450 may be further configurable to generate an alert 496 in response to an at least partial match between any one or more query terms 493 and a connecting term 491. An alert 496 may include any number of features, e.g. a second user identifier 492, one or more query terms 493, a search query 434, images, a profile name, etc. A user may have the ability to customize the features of an alert 496 by, for example, creating a profile and indicating alert preferences. Further, an alert 496 may include an activatable communication channel, which may be a link or similar means for a user to activate a channel of communication between the user and another user on the system. In some embodiments, the activatable communication channel may be similar or identical to the activatable communication channel 337 of FIG. 3. An alert 496 may be transmitted from one or more servers 450 to a first user device 499 in the form of a text message, an email, an instant message, or similar means. Once received by the first user device 499, the alert 496 may be rendered on the user interface (i.e. user interface 128 of FIG. 3) of the first user device 499 in a manner such that a user may interact with the alert 496 features and may, according to some embodiments, use the activatable communication channel to open a channel of communication with another user on the system. By way of example, and not limitation, a channel of communication may be an email, a chat session, an instant message (IM), a text message, a voice message, a voice call, a video call, or other form of communication between the two users.

Using the functionalities, units, and subunits described in detail in FIG. 5 below, the one or more servers 150 may generate a second compilation 495. According to some embodiments, the second compilation 495 may comprise any combination of a second user identifier 492, one or more query terms 493, and any other information. Further, the second compilation 495 may include user identifiers and query terms originating from multiple users, e.g. a first user, a second user, etc., and/or from multiple user devices, e.g. a first user device 499, a second user device 120, a third user device, a fourth user device, etc. In the exemplary embodiment of FIG. 4, the second compilation 495 comprises the second user identifier 492, the query terms 493, and user identifiers and query terms for other users, e.g. "SU2," "SU3," "SU4," etc. The second compilation 495 may be organized and/or stored at one or more servers 150, and/or at one or more databases associated with the one or more servers (such as the database 170 of FIG. 1) in a manner such that it is searchable.

While the second compilation 495 of FIG. 4 is presented as comprising a second user identifier 492 and one or more query terms 493, it should be appreciated that a second compilation 495 may comprise any pairing of information that (1) represents a user, e.g. second user identifier 492, screen name, profile name, IP address, randomly generated identifier, etc., and (2) may be associated with that user, e.g. query terms 493, historically used search terms, profile information, behavior, reviews, geolocation, etc. Further, it should appreciated that query terms 493 may be compiled in a second compilation 495 in their original form or may be a modified version of the original form, e.g. derivatives which may account for spelling mistakes, etc.

The first user device 499 of FIG. 4 may be configurable to generate, using the functionalities and subsystems described in FIG. 1 and FIG. 2, a compilation request 497. The first user device 499 may be further configurable to transmit the compilation request 497 to the one or more servers 450. In response to a received compilation request 497, the one or more servers may generate a compilation response 498. A compilation response 498, according to some embodiments, may include any number of features, including user identifiers 490, 492, connecting terms 491, query terms 493, search queries 434, activatable communication channels, or other information which may be available on the system, e.g. profile information, images, names, locations, any information found in a first compilation 494 or second compilation 495, etc. The composition of the compilation response 498 may be determined by a number of factors, including an at least partial match between any one or more terms included in the compilation request 497 and information included in the second compilation 495 or first compilation 494. In some embodiments, a compilation response 498 may comprise all or substantially all of the information in the second compilation 495 or first compilation 494, or may comprise a subset of that information. In the exemplary embodiment of FIG. 4, the compilation request 497 from the first user device 499 comprises a request for information relating to the second compilation 495 and the compilation response 498 comprises query terms 493 and an activatable communication channel which, when activated on a first user device 499, may cause a communication channel to be opened between the first user device 499 and a second user device 120. Specifically, the compilation request 497 of FIG. 4 is a request for a compilation response 498 comprising query terms 493 and an activatable communication channel for all second users whose second compilation entries contain the query term 493 "BOSTON." As illustrated, second users with the second user identifiers 492 "SU1" and "SU4" both have the query term 493 "BOSTON" associated with their second user identifiers 492. Therefore, the server 450 generates a compilation response 498 with the query terms 493 associated with the second user identifiers "SU1" and "SU4," along with activatable communication channels for each of the users or second user devices 120 associated with the second user identifiers 492. It should be appreciated that, although the exemplary embodiment described above discloses a single compilation response 498 comprising query terms 493 and activatable communication channels for each of the second user identifiers 492 "SU1" and "SU4," each of (1) the query terms 493 associated with the second user identifier 492 "SU1" and the activatable communication channel with that user, and (2) the query terms 493 associated with the second user identifier 492 "SU4" and the activatable communication channel with that user, may each, individually, be considered a compilation response 498. Further, it should be appreciated that a compilation response 498 may comprise additional information about a second user or a user of a second device 120. A second user may customize the information that is sent about them in a compilation response 498 through, for example, setting user preferences associated with a user profile. Notably, however, when a compilation response 498 comprises query terms 493 and an activatable communication channel, the recipient of the compilation response, i.e. user of the first user device 499, may open a line of communication with the user of the second user device 120 while the user of the second user device 120 remains anonymous.

A server 450 may be configurable to transmit the compilation response 498 to a user device, e.g. first user device 499, second user device 120. In response to receiving the compilation response 498, the user device 499, 120, using the subsystems and functionalities of FIG. 1 and FIG. 2, may render the compilation response 498 on the user interface (i.e. user interface 128 of FIG. 3) of the user device in a manner such that a user may interact with the features of the compilation response 498 and may, according to some embodiments, use the activatable communication channel to open a channel of communication with another user on the system.

Figure 5:
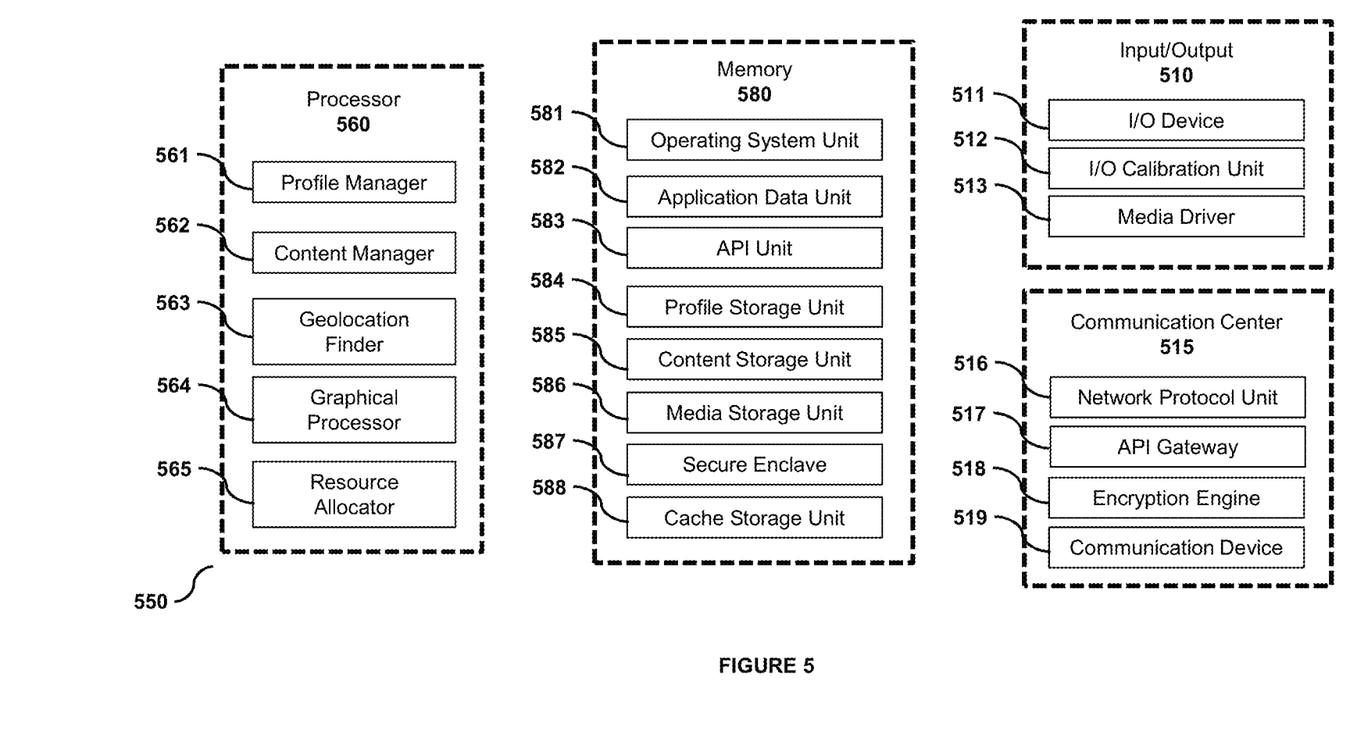
FIG. 5 shows a functional block diagram of a server for control and manipulation of data associated with disclosed systems and methods for network communication disintermediation.

As illustrated in FIG. 5, a server 550 may include, among other elements, any combination of a processor 560, a memory 580, an input/output (I/O) 510, and a communication center 515. As described in present embodiments, each of the processor 560, the memory 580, the I/O 510, and communication center 515 may include a plurality of respective units, subunits, and/or elements. Furthermore, each of the processor 560, the memory 580, the I/O 510, and the communication center 515 may be operatively or otherwise communicatively coupled with each other so as to facilitate the methods and techniques described herein.

The processor 560 may control any one or more of the memory 580, the I/O 510, the communication center 515, or any other unit which may include the server 550, as well as any included subunits, elements, components, devices, or functions performed by each or a combination of the memory 580, the I/O 510, the communication center 515 or any other unit which may include the server 550. Any of the elements or sub-elements of the server 550 presented here may also be included in a similar fashion in any of the other units, subunits, and devices included in the system 100 of FIG. 1. Additionally, any actions described herein as being performed by a processor 560 may be taken by the processor 560 alone, or by the processor 560 in conjunction with one or more additional processors, units, subunits, elements, components, devices, and the like. Additionally, while only one processor 560 may be shown in the figures included here, multiple processors may be present or otherwise included in the server 550 or elsewhere in the operating system of FIG. 1. Thus, while instructions may be described as being executed by the processor 560 or the various subunits of the processor 561, 562, 563, 564, 565, the instructions may be executed simultaneously, serially, or otherwise by one or more multiple processors 560.

In some embodiments, a processor 560 may be implemented as one or more computer processor (CPU) chips, graphical processor (GPU) chips, or some combination of CPU chips and GPU chips, and may include a hardware device capable of executing computer instructions. The processor 560 may execute any combination of instructions, codes, computer programs, and scripts. The instructions, codes, computer programs, and scripts may be received from, stored in, or received from and stored in any combination of the memory 580, the I/O 510, the communication center 515, subunits of the previously described elements, other devices, other computing environments.

In some embodiments, the processor 560 may include, among other elements, subunits. Subunits may include any combination of a profile manager 561, a content manager 562, a geolocation finder 563, a graphical processor 564, and a resource allocator 565. Each of these subunits of the processor 560 may be communicatively or otherwise operably coupled with each other.

The profile manager 561 may facilitate any combination of generation, modification, analysis, transmission, and presentation of a user profile associated with a user, e.g. first user, second user, etc. For example, the profile manager 561 may prompt a user, through a first user device 499 or a second user device 120, to register by inputting authentication credentials, personal identifying information, contact information, preferred buying habits, location, or any other information which may be associated with generating a personal profile for the user. The profile manager 561 may also control or utilize an element of the I/O 510 to enable a user to take a picture or video of themselves or another person. The profile manager 561 may receive, process, analyze, organize, transform, or any combination of these, any received from the user or another computing element as to generate a user profile of a user that may include any combination of personal information, contact information, user preferences, photos, videos, audio clips, a history of user activity, user preferences, user search history, user location, settings, and the like.

The content manager 562 may facilitate any combination of generation, modification, analysis, transmission, and presentation of media content associated with methods and systems for network communication disintermediation. For example, the content manager 562 may control the environment of the application during the execution of various processes. For purposes of illustration and not limitation, media content for which the content manager 562 may be responsible may include any combination of advertisements, images, text, themes, audio files, video files, documents, and the like. In some embodiments, the content manager 562 may also interface with any combination of a third-party content server, memory location, and the database illustrated in FIG. 1.

The geolocation finder 563, particularly in communication with geolocation information provided by GPS subsystems 129 of user devices 120 (see FIG. 1) may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 563 may include any one or a combination of various sensors, specifically-purposed hardware elements for enabling the geolocation finder 563 to acquire, measure, and transform location information.

The graphical processor (GPU) 564 may facilitate any combination of generation, modification, analysis, processing, transmission, and presentation of visual content. The GPU 564 may be configured to render visual content for presentation on a user device 120 and/or to analyze visual content for metadata associated with a user or a user device. In some embodiments, this visual content may include the display of search result and/or activatable communication channels. The GPU 564 may include multiple GPUs and may therefore be configured to perform and/or execute multiple processes in parallel.

The resource allocator 565 may facilitate any one or combination of the determination, monitoring, analysis, and allocation of resources throughout the server 550, the system 100, any component of the system 100, or other computing environments. For example, the resource allocator 565 may facilitate interaction between the server 550, any subunit of the server 550, and a high volume (e.g. multiple) of users or associated user devices 120. As such, computing resources of the server 550 utilized by any one or a combination of the processor 561, the memory 580, the I/O 510, the communication center 515, and any subunit of these units, such as processing power, data storage space, network bandwidth, and the like may be in high demand at various times during operation. Accordingly, the resource allocator 565 may be configured to manage the allocation of various computing resources as they are required by particular units or particular subunits of the server 550.

In some embodiments, the resource allocator 565 may include sensors and/or other specially-purposed hardware for monitoring performance of each unit and/or subunit of the server 550, as well as hardware for responding to the computing resource needs of each unit or subunit. In some embodiments, the resource allocator 565 may utilize computing resources of a second computing environment separate and distinct from the server 550 to facilitate a desired operation.

In some embodiments, factors affecting the allocation of computing resources by the resource allocator 565 may include the number of ongoing user device connections and/or other communication channel connections, a duration during which computing resources are required by one or more elements of the server 550, and/or the like. In some embodiments, computing resources may be allocated to and/or distributed amongst a plurality of second computing environments included in the server 550 based on one or more factors mentioned above. In some embodiments, the allocation of computing resources of the resource allocator 565 may include one or more resource allocators 565 flipping a switch, adjusting processing power, adjusting memory size, partitioning a memory element, transmitting data, controlling one or more input and/or output devices, modifying various communication protocols, and the like. In some embodiments, the resource allocator 565 may facilitate utilization of parallel processing techniques such as dedicating a plurality of GPUs included in the processor 560.

In some embodiments, the memory 580 may be utilized for one or any combination of storing, recalling, receiving, transmitting, and/or accessing various files and/or information during operation of the server 550. For example, the memory 580 may be utilized for storing first compilations 494, second compilations 495, and/or associated query terms 493, user identifiers 492, 490, search queries 434, and/or other information. The memory 580 may additionally be used for storing, recalling, and/or updating user profile information and the like. The memory 580 may include various types of data storage media such as solid state storage media, hard disk storage media, and any other type of data storage medium which may be known to a person of ordinary skill in the art. The memory 580 may include dedicated hardware elements such as hard drives and/or servers, as well as software elements such as cloud-based storage drives. For example, the memory unit 304 may include various subunits such as an operating system unit 581, an application data unit 582, an application programming interface (API) unit 583, a profile storage unit 584, a content storage unit 585, a video storage unit 586, a secure enclave 587, and/or a cache storage unit 588.

The memory 580 and any of its subunits described here may include any one or any combination of random access memory (RAM), read only memory (ROM), and various forms of secondary storage. RAM may be used to store volatile data and/or to store instructions that may be executed by the processor 560. For example, the data stored may be any one or a combination of a command, a current operating state of the server 550, an intended operating state of the server 550, and the like. As a further example, data stored in the memory 580 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 580 may include one or more databases for storing any data described here, e.g. the database 170 of FIG. 1. Additionally or alternatively, one or more secondary databases located remotely from the server 550 may be utilized and/or accessed by the memory 580.

The operating system unit 581 may facilitate deployment, storage, access, execution, and/or utilization of an operating system utilized by the server 550 and/or any other computing environment described herein. In some embodiments, the operating system may include various hardware and/or software elements that serve as a structural framework for enabling the processor 560 to execute various operations such as the comparison of query terms 493 or search queries 434 to connecting terms 491, generation of results 435, alerts 496, and compilation responses 498, controlling the user interface 128, etc. The operating system unit 581 may further store various pieces of information and/or data associated with operation of the operating system and/or the server 550 as a whole, such as a status of computing resources (e.g., processing power, memory availability, resource utilization, and/or the like), runtime information, modules to direct execution of operations described herein, user permissions, security credentials, and the like.

The application data unit 582 may facilitate deployment, storage, access, execution, and/or utilization of an application utilized by the server 550 or any other computing environment described herein (e.g., a user device 120). For example, users may be required to download, access, and/or otherwise utilize a software application on a user device 120 such as a smartphone or other internet-enabled device in order for various operations described herein to be performed. As such, the application data unit 582 may store any information and/or data associated with the application which may allow the application and/or user device 120 to perform methods associated with network communication disintermediation. As such, information included in the application data unit 582 may enable a user to execute various operations described here. The application data unit 582 may further store various pieces of information and/or data associated with operation of the application and/or the server 550 as a whole, such as a status of computing resources (e.g., processing power, memory availability, resource utilization, and/or the like), runtime information, modules to direct execution of operations described herein, user permissions, security credentials, and the like.

The application programming interface (API) unit 583 may facilitate deployment, storage, access, execution, and/or utilization of information associated with APIs of the server 550 and/or any other computing environment described herein (e.g., a user device). For example, server 550 may include one or more APIs for enabling various devices, applications, and/or computing environments to communicate with the server 550, multiple other servers, databases, or other user devices. Accordingly, the API unit 583 may include API databases containing information that may be accessed and/or utilized by applications and/or operating systems of other devices and/or computing environments associated with network communication disintermediation. An API may direct communications between the background component of the user device 120 and the server 550. In some embodiments, each API database may be associated with a customized physical circuit included in the memory unit 580 and/or the API unit 583. Additionally, each API database may be public and/or private, and so authentication credentials may be required to access information in an API database.

The profile storage unit 584 may facilitate deployment, storage, access, and/or utilization of information associated with user profiles of users by the server 550 and any other computing environment described here (e.g., a user device). For example, the profile storage unit 550 may store one or more of a user's contact information, authentication credentials, user preferences, user history of behavior, personal information, search histories, purchasing histories, user ratings, and metadata. The profile storage unit 584 may store a user's images, searching histories, a user's location history as determined through the GPS subsystems 129 of the user device 120, etc. In some embodiments, the profile storage unit 584 may communicate with the profile management unit 561 to receive and/or transmit information associated with a user's profile.

The content storage unit 585 may facilitate deployment, storage, access, and/or utilization of information associated with requested content by the server 550 and/or any other computing environment described here (e.g., a user device 120 such as a mobile device). For example, the content storage unit 585 may store one or more of images, text, videos, audio content, advertisements, product lists, user recommendations, and metadata to be presented to a user during operations described herein. In some embodiments, the content storage unit 585 may communicate with the content management unit 562 to receive and/or transmit content files.

The media storage unit 586 may facilitate one or more of deployment, storage, access, analysis, and utilization of media content by the server 550 and any other computing environment described herein (e.g., a user device). Media content may be images, videos, audio files, and any other form of communicative media. For example, the media storage unit 586 may store one or more chat histories between a user and other users on the system 100. Further, the media storage unit 586 may store one or more searches, results 435, alerts 496, etc., generated by any unit or subunit of a server 550 or user device. Media content generated or used in performing any of the methods disclosed here may be stored in the media storage unit 586 so that the media content may be analyzed by various components of the server 550 both in real time and at a time after receipt of the media content. In some embodiments, the media storage unit 586 may communicate with the GPUs 564 to facilitate any of the processes described here. In some embodiments, media content may include audio, images, text, video feeds, and/or any other media content associated with methods and systems for network communication disintermediation.

The secure enclave 587 may facilitate secure storage of data. In some embodiments, the secure enclave 587 may include a partitioned portion of storage media included in the memory unit 580 that is protected by various security measures. For example, the secure enclave 587 may be hardware secured. In other embodiments, the secure enclave 587 may include one or more firewalls, encryption mechanisms, and/or other security-based protocols. Authentication credentials of a user may be required prior to providing the user access to data stored within the secure enclave 587. In some embodiments, the secure enclave 587 may store sensitive user information such as credit card data, sensitive personal data, and/or data associated with the location of a person throughout time.

The cache storage unit 588 may facilitate short-term deployment, storage, access, analysis, and/or utilization of data. In some embodiments, the cache storage unit 588 may serve as a short-term storage location for data so that the data stored in the cache storage unit 588 may be accessed quickly. In some embodiments, the cache storage unit 588 may include RAM and/or other storage media types that enable quick recall of stored data. The cache storage unit 588 may include a partitioned portion of storage media included in the memory 580. In some embodiments, the cache storage unit 588 may store data associated with a first compilation 494 or a second compilation 495 or a portion of either or both.

The I/O unit 510 may include hardware and/or software elements for enabling the server 550 to receive, transmit, and/or present information. For example, elements of the I/O unit 550 may be used to receive user input from a user via a user device 120, present results 435, alerts 496, or compilation responses 498 to the user via the user device 120, present suggested matches to the user via a user device 120, and the like. In this manner, the I/O unit 510 may enable the server 550 to interface with a human user in a manner such that the user may use the methods described here. As described, the I/O unit 510 may include subunits such as any one or a combination of an I/O device 511, an I/O calibration unit 512, and/or video driver 513.

The I/O device 510 may facilitate any one or any combination of the receipt, transmission, processing, presentation, display, input, and output of information as a result of executed processes described here. In some embodiments, the I/O device 510 may include a plurality of I/O devices. In some embodiments, the I/O device 510 may include one or more elements of any one or a combination of a user device 120, a computing system, a server 550, and a similar device.

The I/O device 511 may include a variety of elements that enable a user to interface with the server 550. For example, the I/O device 511 may include a keyboard, a touchscreen, a button, a sensor, a biometric scanner, a laser, a microphone, a camera, an internet-enabled device, and/or another element for receiving and/or collecting input from a user. Additionally and/or alternatively, the I/O device 511 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 511 may communicate with one or more elements of the processor 560 and/or the memory unit 580 to execute operations described herein. For example, the I/O device 511 may include a display, which may utilize the GPU 564 to present media content stored in the media storage unit 586 to a user of a user device 120.

The I/O calibration unit 512 may facilitate the calibration of the I/O device 511. For example, the I/O calibration unit 512 may detect and/or determine one or more settings of the I/O device 511, and then adjust and/or modify settings so that the I/O device 511 may operate more efficiently. In some embodiments, the I/O calibration unit 512 may utilize a media driver 513 (or multiple media drivers) to calibrate the I/O device 511. The media driver 513 may be installed on a user device 120 so that the user device 120 may recognize and/or integrate with the I/O device 5114, thereby enabling media content to be displayed, received, generated, and the like. In some embodiments, the I/O device 511 may be calibrated by the I/O calibration unit 512 by based on information included in the media driver 513.

The communication center 515 may facilitate establishment, maintenance, monitoring, and/or termination of communications between the server 550 and other devices such as user devices 120, other computing environments, third party server systems, and the like. The communication center 515 may further enable communication between various elements (e.g., units and/or subunits) of the server 550 as needed. In some embodiments, the communication center 515 may include a network protocol unit 516, an API gateway 517, an encryption engine 518, and/or a communication device 519. The communication center 515 may include hardware and/or software elements.

The network protocol unit 516 may facilitate establishment, maintenance, and/or termination of a communication connection between the server 550 and another device (e.g. user device 120) by way of a network. For example, the network protocol unit 516 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, powerline communication (PLC) protocols, and the like. In some embodiments, facilitation of communication between the server 550 and any other device, as well as any element internal to the server 550, may include transforming and/or translating data from being compatible with a first communication protocol to being compatible with a second communication protocol. In some embodiments, the network protocol unit 516 may determine and/or monitor an amount of data traffic to consequently determine which particular network protocol is to be used for establishing a connection with a user device, transmitting data, and/or performing other operations described herein.

The API gateway 517 may facilitate the enablement of other devices and/or computing environments to access the API unit 583 of the memory 580 of the server 550. For example, a user device 120 may access the API unit 583 via the API gateway 517. In some embodiments, the API gateway 517 may be required to validate user credentials associated with a user of a user device 120 prior to providing access to the API unit 583 to the user. The API gateway 517 may include instructions for enabling the server 550 to communicate with another device.

The encryption engine 518 may facilitate any one or any combination of translation, encryption, encoding, decryption, and decoding of information received, transmitted, and/or stored by the server 550. For example, the encryption engine 518 may encrypt data associated with a user's credit card information, etc. Using the encryption engine, each transmission of data may be encrypted, encoded, and/or translated for security reasons, and any received data may be encrypted, encoded, and/or translated prior to its processing and/or storage. In some embodiments, the encryption engine 518 may generate any one or combination of an encryption key, an encoding key, a translation key, and the like, which may be transmitted along with any data content.

The communication device 519 may include a variety of hardware and/or software specifically purposed to enable communication between the server 550 and another device (e.g. user device 120), as well as communication between elements of the server 550. In some embodiments, the communication device 519 may include one or more radio transceivers, chips, analog front end (AFE) units, antennas, processors, memory, other logic, and/or other components to implement communication protocols (wired or wireless) and related functionality for facilitating communication between the server 550 and any other device. Additionally and/or alternatively, the communication device 519 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

As used herein, the term "signal" may refer to a single signal or multiple signals. The term "signals" may refer to a single signal or multiple signals. Any reference to a signal may be a reference to an attribute of the signal.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems such as servers.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments.

While various embodiments in accordance with the disclosed principles have been described above, it should be understood that they have been presented by way of example only, and are not limiting. Furthermore, any reference in this disclosure to "invention" in the singular should not be used to argue that there is only a single point of novelty in this disclosure. Multiple inventions may be set forth herein.

What is claimed:

1. A computer system for establishing communication channels based on a query, the system comprising:
   one or more non-transitory computer-readable storage media storing instructions; and
   one or more processors configured to execute the instructions to perform:
   receiving, from a plurality of supplier computers, a plurality of connecting terms, wherein each supplier computer is associated with a unique supplier identifier and each supplier computer communicates one or more connecting terms, wherein each connecting term describes a product or a supplier;
   generating a first compilation comprising the plurality of connecting terms and each unique supplier identifier;
   receiving, from a buyer computer associated with a unique buyer identifier, a search query comprising one or more query terms describing a specific list of products;
   in response to receiving the search query, performing a first search using the one or more query terms on the first compilation;
   transmitting, to the buyer computer, a result based on an at least partial match between a query term and a connecting term;
   transmitting, to a supplier computer, an alert based on an at least partial match between a query term and a connecting term, the alert including an option to activate an activatable communication channel with the buyer computer.

2. The system of claim 1, the alert including the search query or profile information associated with the buyer computer.

3. The system of claim 1, the method further comprising:
   generating a second compilation comprising buyer computer identifiers and query terms from multiple buyer computers;
   receiving a compilation request from a second supplier computer;
   transmitting a compilation response to the second supplier computer.

4. The system of claim 1, wherein the buyer computer comprises a first buyer computer associated with a first unique buyer identifier, the method further comprising:
   receiving, from a second buyer computer associated with a second unique buyer identifier, a request to view a result of the first search;
   transmitting, to the second buyer computer, a result of the first search including the first unique buyer identifier.

5. The system of claim 1, the connecting term being a string of characters or an image.

6. The system of claim 1, the one or more query terms being derived from advertising data provided by the supplier computer or reviews of the specific supplier or the specific list of products provided by buyers.

7. The system of claim 1, wherein each buyer identifier of the plurality of buyer identifiers comprises profile information or geolocation location associated with the buyer identifier.

8. The system of claim 1, further comprising:
   receiving, from the supplier computer, a selection of the option to activate the communication channel included in the alert;

establishing a communication channel between the supplier computer and the buyer computer, wherein the buyer computer identifier is anonymous.

9. A computer-implemented method of allowing a query for search terms to establish appropriate communication channels, comprising:
receiving, from a plurality of supplier computers, a plurality of connecting terms, wherein each supplier computer is associated with a unique supplier identifier and each supplier computer communicates one or more connecting terms, wherein each connecting term describes a product or a supplier;
generating a first compilation comprising the plurality of connecting terms and each unique supplier identifier;
receiving, from a buyer computer associated with a unique buyer identifier, a search query comprising one or more query terms describing a specific list of products;
performing, by a processor, a first search using the one or more query terms on the first compilation;
transmitting, to the buyer computer, a result based on an at least partial match between a query term and a connecting term;
transmitting, to a supplier computer, an alert based on an at least partial match between a query term and a connecting term, the alert including an option to activate an activatable communication channel with the buyer computer.

10. The computer-implemented method of claim 9, the alert including the search query or profile information associated with the buyer computer.

11. The computer-implemented method of claim 9, further comprising:
generating a second compilation comprising buyer computer identifiers and query terms from multiple buyer computers;
receiving a compilation request from a second supplier computer;
transmitting a compilation response to the second supplier computer.

12. The computer-implemented method of claim 9, wherein the buyer computer comprises a first buyer computer associated with a first unique buyer identifier, the method further comprising:
receiving, from a second buyer computer associated with a second unique buyer identifier, a request to view a result of the first search;
transmitting, to the second buyer computer, a result of the first search including the first unique buyer identifier.

13. The computer-implemented method of claim 9, the connecting term being a string of characters or an image.

14. The computer-implemented method of claim 9, the one or more connecting terms being derived from advertising data provided by the supplier computer or reviews of the specific supplier or the specific list of products provided by buyers.

15. The computer-implemented method of claim 9, wherein each buyer identifier of the plurality of buyer identifiers comprises profile information or geolocation location associated with the buyer identifier.

16. The computer-implemented method of claim 9, further comprising:
receiving, from the second buyer computer, a selection of the option to activate the activatable communication channel included in the alert;
establishing a communication channel between the second buyer computer and the specific supplier computer, wherein the buyer computer identifier is anonymous.

* * * * *